United States Patent
Solberg, Jr. et al.

(10) Patent No.: US 6,249,261 B1
(45) Date of Patent: Jun. 19, 2001

(54) POLYMER, COMPOSITE, DIRECTION-FINDING ANTENNA

(75) Inventors: Ruell F. Solberg, Jr.; Dayle D. Winnie; Steven P. Saulnier; Charles K. Baker; Patrick J. Siemsen; Charles H. Parr, all of San Antonio, TX (US)

(73) Assignee: Southwest Research Institute, San Antonio, TX (US)

(*) Notice: Subject to any disclaimer, the term of this patent is extended or adjusted under 35 U.S.C. 154(b) by 0 days.

(21) Appl. No.: 09/533,981

(22) Filed: Mar. 23, 2000

(51) Int. Cl.[7] .......................... E04H 12/10; H01P 11/00; B32B 18/00
(52) U.S. Cl. .......................... 343/801; 343/874; 343/890
(58) Field of Search .................................. 343/801, 874, 343/890

(56) References Cited

U.S. PATENT DOCUMENTS 5,771,567 * 6/1998 Pierce et al. .......................... 29/600
5,962,122 * 10/1999 Walpita et al. .......................... 428/325
6,026,627 * 2/2000 Moore .................................. 52/651.02

* cited by examiner

Primary Examiner—Don Wong
Assistant Examiner—James Clinger
(74) Attorney, Agent, or Firm—Gunn, Lee & Keeling

(57) ABSTRACT

A direction-finding antenna constructed from polymer composite materials which are electrically conductive is shown with the polymer composite materials replacing traditional metal materials. An inherent advantage of replacing metal materials is significantly lower radar reflectivity (radar cross section) and lower weight. The reduced radar reflectivity reduces the range of detectability of the antenna by possible adversaries. Despite significantly lower radar reflectivity, the antenna assembly has direction-finding characteristics which are essentially equivalent to traditional metal antennas.

13 Claims, 9 Drawing Sheets

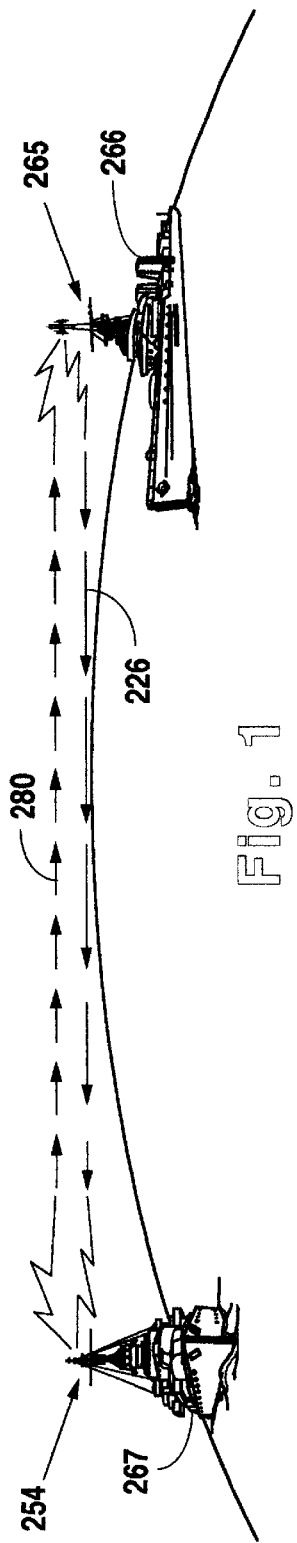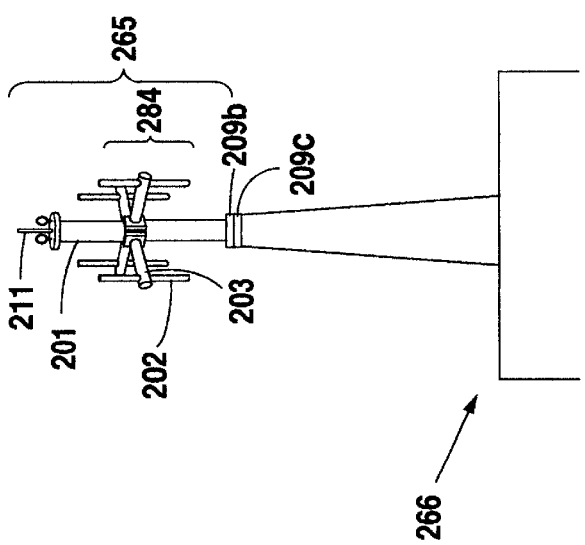

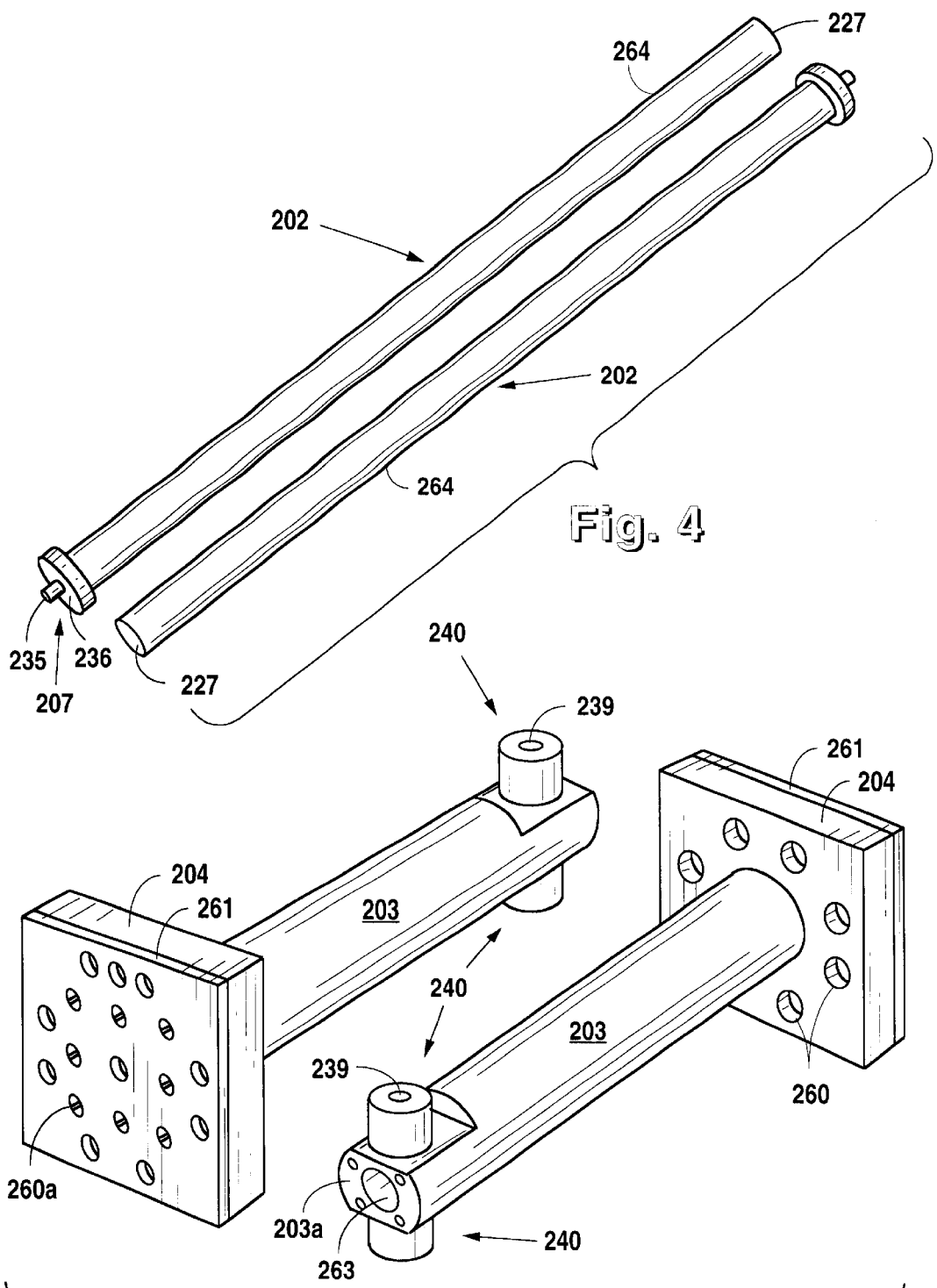

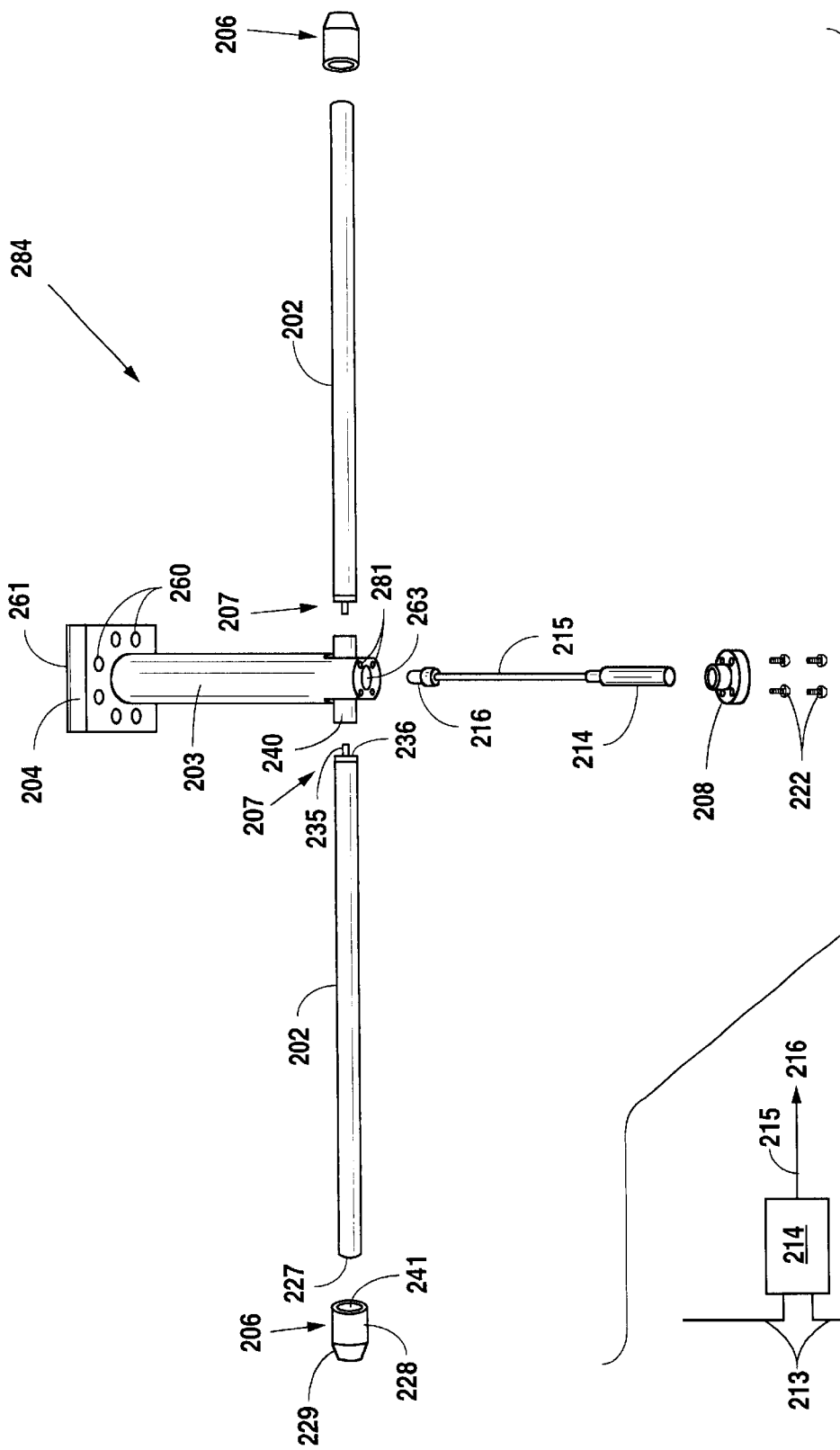

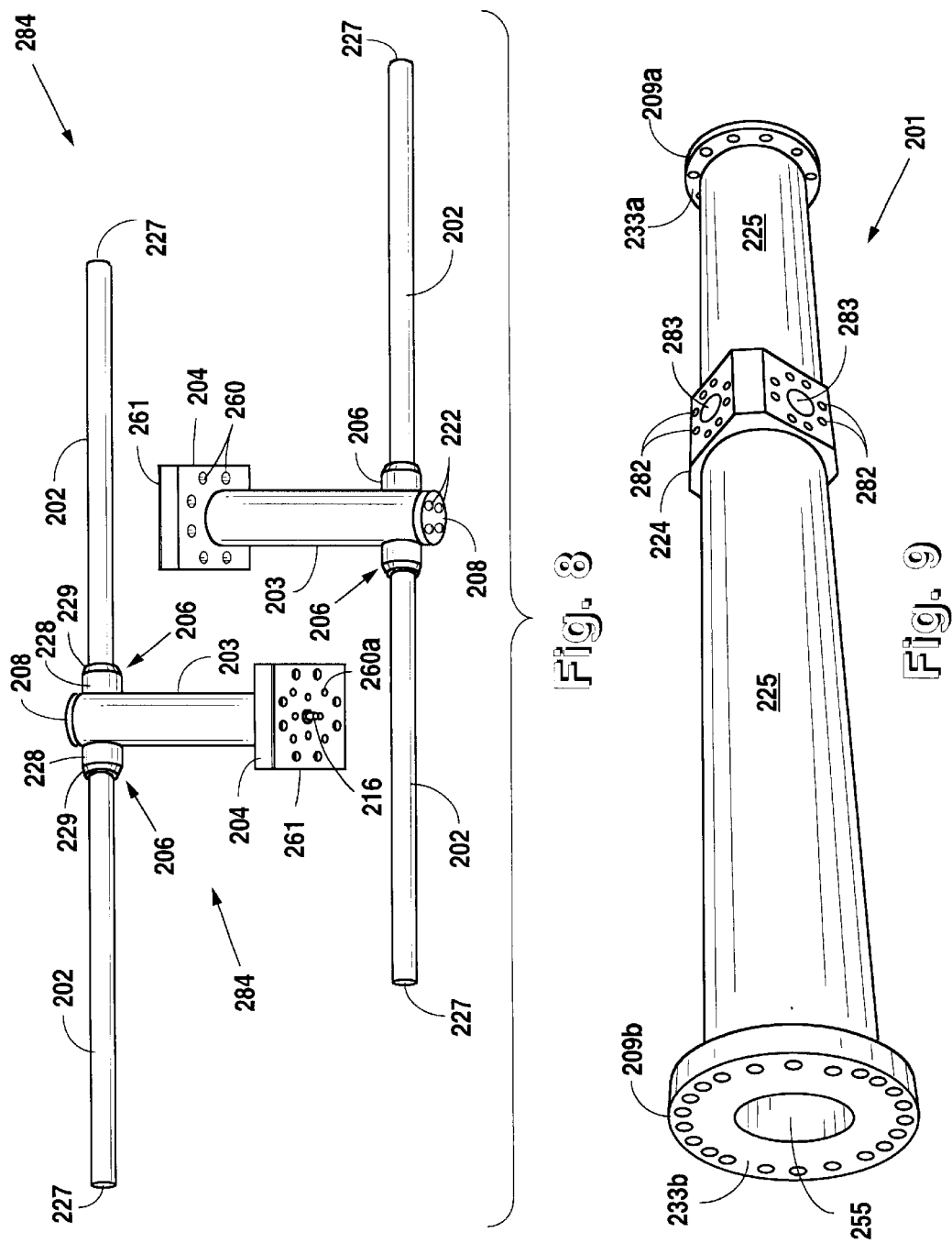

POLYMER, COMPOSITE, DIRECTION-FINDING ANTENNA

BACKGROUND OF THE INVENTION

1. Field of the Invention

Applicants' invention relates to devices which serve as antennas to receive and transmit electromagnetic energy. More specifically, the present invention relates to the use of antennas for direction-finding systems. The antennas are fabricated from non-metallic, polymer, composite materials rather than metals, which provide certain advantages, particularly with respect to being more difficult to detect by radar and being lighter weight. Also, there is an ability to tailor the electrical conductivity and the radar reflectivity of the composite materials.

2. Background Information

Presently, antennas are used in many configurations and with many different electrical connections to receive and transmit electromagnetic energy. Some antennas are very simple, such as car radios; but other antennas have large numbers of antenna elements in complex geometric arrays with very complex electrical connections between the elements. A common feature of the antennas is they conduct electrical signals and currents so that electromagnetic energy is transmitted and/or received. This requires that the materials of the antennas, especially the antenna elements, be electrically conductive, which has required in the past that they be fabricated from metals. A minimum requirement is that the material of the antenna elements have sufficient electrical conductivity for the antenna to receive or transmit electromagnetic energy efficiently. Furthermore, the material of the supporting structure for the antenna elements should have sufficiently high electrical conductivity to provide shielding for electronics within the structure and to provide electrical symmetry.

Radio direction-finding (DF) is the process of electronically determining the direction of arrival of a radio signal transmission. The techniques for obtaining cross bearings of an emitter and using triangulation to estimate target positions are well-known. The ability to ascertain the geographical location of an emitting transmitter offers important capabilities for many modern communications applications, such as land, air, and sea rescue, duress alarm and location, law enforcement, and military intelligence. There are numerous direction-finding antennas and systems in the prior art.

Some receiving antennas can be used for radio direction-finding purposes. There are a number of types of antenna elements which are positioned with respect to each other in different configurations. Examples of types of antenna elements include monopoles, dipoles, simple loops, and ferrite loops. Configurations include Adcocks, dipole Adcocks, quadruple Adcocks, Rocke Adcocks, spaced loops, crossed loops, Breuningers, and doppler arrays. Also, the antenna configuration can be rotating or nonrotating and fixed or mobile.

Typically, direction-finding antennas are mounted high and/or on the external surfaces of objects so they have unobstructed views of the arriving electromagnetic energy. This is especially the case when the platform on which they are mounted is a ship, airplane, land vehicle, or building.

In the past, the requirement of high electrical conductivity of materials from which antennas were fabricated necessitated that metals be used. Now, polymeric materials with sufficiently high electrical conductivities along with other desirable properties have been developed and are commercially available. A polymer is a large molecule built up by the repetition of small, simple chemical units. The repeat unit is usually equivalent to the monomer, or starting material from which the polymer is formed. Polymers are mostly compounds of carbon, hydrogen, nitrogen, and oxygen and generally melt or decompose at high temperatures. The quantity of basic polymer materials is large with variations and modifications increasing the number considerably.

Recent work with electrically-conductive polymer materials has resulted in increased electrical conductivities and improved processabilities and environmental stabilities. The conductive polymers can be applied as coatings on other material filaments, for example, which can then be woven into fabrics. Several major classes of electrically conductive materials now exist, including polyacetylene, polyheterocycles (polypyrole and polycarbazole), and poly (arylene vinylenes). Fiberglass filaments which were coated with polypyrole and then woven into fabrics were used here. The electrical conductivity level can be varied significantly as a function of the dopant level in the conductive materials. These conductive materials are used with composite polymers.

Composite materials are composed of at least two different constituents to obtain the optimum combination of properties of the individual elements. The constituents may be metals, polymers, ceramics, glasses, cements, and other materials. Often a composite material is created from fiber or cloth, which serves as a reinforcement, in a matrix of another material. The reinforcement provides strength properties (carries the load, provides stiffness, etc.) of the composite while the matrix holds the reinforcement in place, distributes or transfers loads applied to the composite, and protects the reinforcement from damage and environmental degradation. The matrix can be a plastic, metal, ceramic, glass, etc. in which the reinforcement is embedded. Thermosetting polymers are used often for the matrices and include epoxy, polyester, phenolic, and polyimide resins. The reinforcement can range from flakes or short fibers through complex textile forms. The constituents of a composite material do not dissolve or merge completely, so that they retain their identity as they act together.

An inherent disadvantage of conventional metal direction-finding antennas is they have high reflections of radar signals. For certain conditions, such as during a war, stealth or low observability characteristics are very important. Determining the radar cross section (RCS) of objects is another way to characterize and compare radar reflections from objects. RCS is a measure of the size of a target observed by radar. It is expressed in decibels and referenced to a standard target. RCS is a function of the physical cross section area, shape, material, and orientation of the target and the frequency and polarization of the incident energy.

Because antennas fabricated from fiberglass composite materials have much lower radar reflections, and much lower radar cross sections, they have significant advantages when that is important. When low radar observability of a direction-finding antenna is desired, a good material characteristic is high electrical conductivity at the DF frequencies of interest, about 30 megaHertz (MHz) to about 1 gigaHertz (GHz), with low conductivity at radar frequencies, generally well above 1 GHz. In addition, the weights of polymer composite antennas may be significantly less, which is very important for certain applications.

SUMMARY OF THE INVENTION

It is an object of the present invention to provide a novel type of antenna which has optimal direction-finding accuracy and sensitivity with lower radar reflectivity and lower radar cross section.

It is another object of the present invention to provide an antenna both partially and/or completely constructed of a polymer composite material.

It is another object of the present invention to tailor the electrical conductivity and radar reflectivity characteristics of the materials from which the antenna is constructed.

It is another object of the present invention to provide a lightweight antenna.

It is another object of the present invention to provide an optimal antenna for use in wartime or hostile conditions.

It is another object of the present invention to design an antenna of higher specific tensile strength.

It is another object of this invention to design an antenna that is more resistant to environmental damage.

It is a further object of the present invention to design an antenna which is useful for search and rescue.

In satisfaction of these and related objectives, applicants' present invention provides for an antenna with these characteristics where the antenna is constructed of a composite with an electrically-conductive polymer. In times of military confrontations, this invention will be particularly useful to its practitioner. With the current use of metal antennas, radar reflectivity of the antenna is high such that the adversary can detect the practitioner's ship, for instance, from much farther away. In contrast, with a conductive-polymer, composite antenna, the radar reflectivity is reduced and, therefore, an observer would have to be much closer before detecting the practitioner or the power of the radar would have to be increased, which increases the detectability of the radar.

BRIEF DESCRIPTION OF THE DRAWINGS

FIG. 1 is a pictorial view of the earth's surface illustrating one ship using its radar to monitor a second ship that is approaching and has a preferred embodiment.

FIG. 2 is a perspective view of the preferred embodiment of an antenna assembly as mounted on top of a ship.

FIG. 4 is a perspective view of dipole verticals for the dipole antenna elements.

FIG. 5 is a perspective view of booms for the dipole antenna elements.

FIG. 6 is an electrical schematic representation of a single dipole antenna element.

FIG. 7 is an exploded perspective view of many of the individual parts of a single dipole antenna element.

FIG. 8 is perspective views of assembled opposing dipole antenna elements.

FIG. 9 is a perspective view of an assembled mast for the antenna assembly.

DETAILED DESCRIPTION OF THE PREFERRED EMBODIMENT

Figure 3:
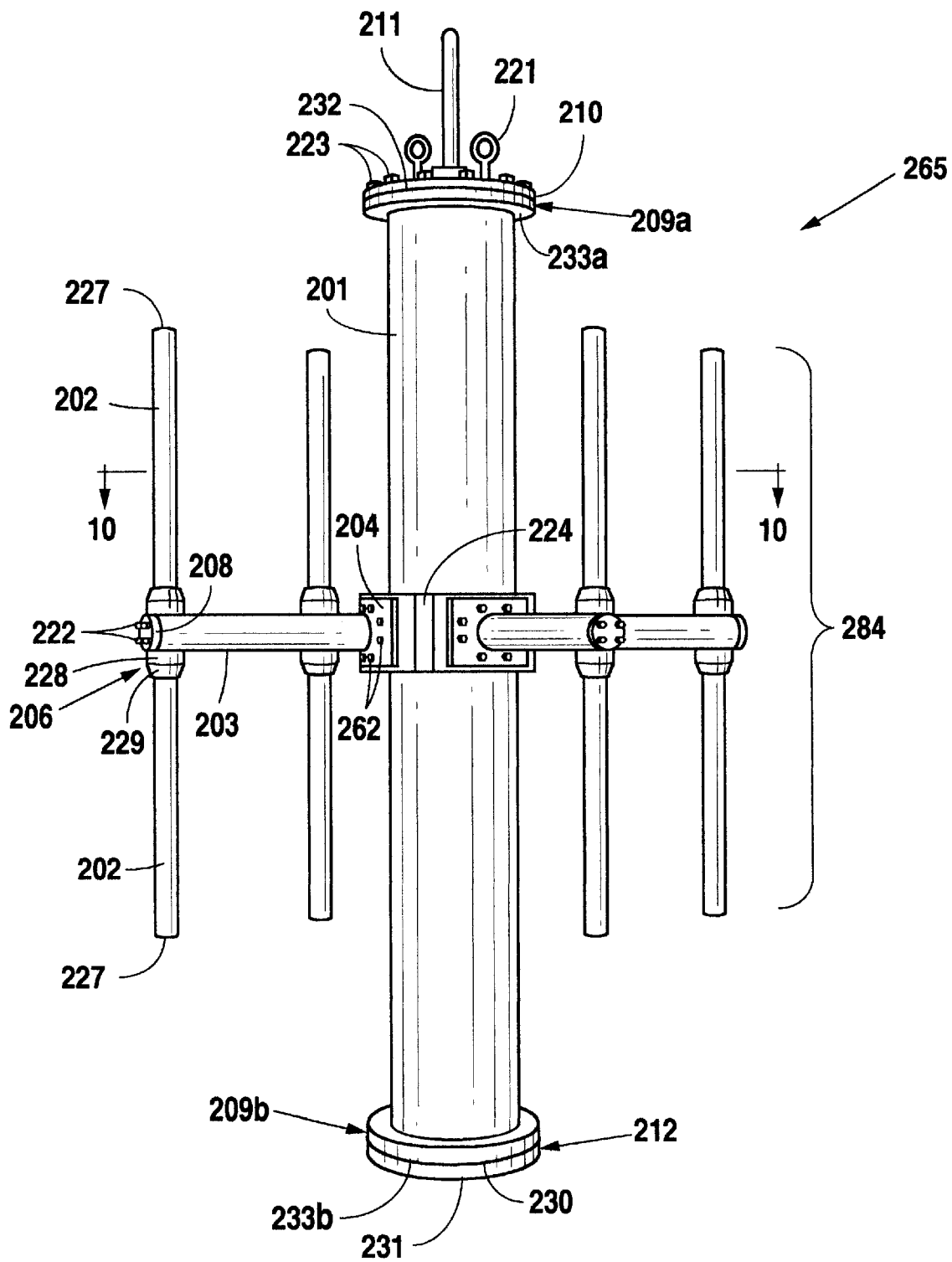
FIG. 3 is a perspective view of the preferred embodiment of a crossed-dipole Adcock antenna assembly.

Referring to FIG. 1, a pictorial view of the preferred embodiment mounted on one ship (266) approaching a hostile ship (267) using its radar is shown. The hostile ship (267) is attempting to locate other ships at long range by using its radar. When the hostile ship (267) sends out radar energy (280) through its emitting source antenna (254), the radar energy (280) will reflect from the approaching ship (266), including its antenna assembly (265), and return to the hostile ship (267) for detection. Currently, direction-finding antennas are constructed of metal. However, metal has high reflectivity (226) of the radar energy (280) back to the hostile ship (267). It is known that the shape of the vessel and/or the use of radar absorbing materials (RAM) can be used to reduce the visibility of that vessel to radar.[1] However, materials which do not reflect radar, such as electrical insulators, cannot be used to construct direction-finding antennas because antennas made from such materials will not conduct electrical signals caused by the passing electromagnetic energy. If the electrical signals are not conducted to the electrical circuitry, there will not be any sensing of the passing electromagnetic energy and no possibility to locate the site of the emitter. It is also known in the prior art that certain polymers can be used to construct radar absorbing materials[2]. Again, absorption of radar energy (280), as well as direction-finding signals of interest, would not be conducive to the operation of the direction-finding antenna. An antenna requires that the material from which it is fabricated be electrically conductive. It is known that certain polymers can be doped to cause them to be electrically conductive.[3] However, the nature of a low-radar-reflective, direction-finding antenna dictates that it be selectively conductive, that is, it should have high conductivity for direction-finding signals and low conductivity of radar energy (280). It is further known in the prior art that chiral molecules can be used as coatings of electromagnetic scatterers which alter the scattering of surface waves from the surface.[4] It is also known that a cylindrical dielectric lens or disk can be used as an antenna.[5] Further, it is known in the prior art that radar bandwidths can be expanded to detect stealth objects.[6] It is not known in the prior art whether certain non-metal substances can be combined to create an antenna which has good direction-finding characteristics along with reduced radar reflectivity in comparison to metallic materials.

[1] Roger A. Stonier, "Stealth Aircraft and Technology from World War II to the Gulf, Part I: History and Background," SAMPE Journal, Vol. 27, No. 4, July/Aug 1991, pp. 9–17; Roger A. Stonier, "Part II: Application and Design," SAMPE Journal, Vol. 27, No. 5, Sept./Oct. 1991, pp. 9–18; J. Wayne Burns, "Introduction to Stealth Technology and Stealth Aircraft Weight Penalties," SAWE Journal, Vol. 53, No. 1, Fall 1993, pp. 40–58; Gene P. Shumaker and Walter B. Mays, "Multi-Fiber Species Artificial Dielectric Radar Absorbing Material and Method for Producing Same," U.S. Pat. No. 5,661,484, Aug. 26, 1997; Howard A. Tanner, "Fibrous Microwave Absorber," U.S. Pat. No. 2,977,591, Mar. 28, 1961; R. Neal Cain and Albert J. Corda, "Active Radar Stealth Device," U.S. Pat. No. 5,036,323, Jul. 30, 1991; Walter J. Dwyer, "Dished Annular, Radiofrequency Absorber and Method of Manufacture," U.S. Pat. No. 3,078,461, Feb. 19, 1963.

[2] Laurent Olmedo, et al., "Microwave Absorbing Materials Based on Conducting Polymers," Advanced Materials, Vol. 5, No. 5, May 1993, pp. 373–377; P. T. C. Wong, et al., "Large Area Conducting Polymer Composites and Their Use in Microwave Absorbing Material," Electronic Letters, Vol. 28, No. 17, Aug. 1992, pp. 1651–1653; L. Olmedo, et al., "Microwave Properties of Organically Based Materials," 39th International SAMPE Symposium, April 1994, pp. 72–80; L. Olmedo, et al., "Microwave Properties of Conductive Polymers," Synthetic Metals, Vol. 69, 1995, pp. 205–208; and Arthur J. Epstein, et al, "Electromagnetic Radiation Absorbers and Modulators Comprising Polyaniline," U.S. Pat. No. 5,294,694, Mar. 15, 1994.

[3] Krishna Naishadham, et al., "Measurement of the Microwave Conductivity of a Polymeric Material with Potential Applications in Absorbers and Shielding," IEEE Transactions on Microwave Theory and Techniques, Vol. 39, No. 7, July 1991, pp. 1158–1164; Akif Kaynak, et al., "A Study of Microwave Transmission, Reflection, Absorption, and Shielding Effectiveness of Conducting Polypyrole Films," Journal of Applied Polymer Science, Vol. 54, No. 3, Oct. 1994, pp. 269–278; Takaflimi Hayashi, et al., "Frequency-Dependent Conductivity in Polyaniline," Japanese Journal of Applied Physics, Vol. 26, No. 11, Nov. 1987, pp. L1800–L1802; F. Legros, et al., "Dielectric Properties of Doped Polypyrole in the 5Hz-1GHz Frequency Range," Materials Research Bulletin, Vol. 19, No. 9, Sept. 1984, pp. 1109–1117; Anqing Lian, et al., "Broadband Dielectric and Conducting Properties of Poly (N-alkylanilines)," Synthetic Metals, Vol.74, 1995, pp.21–27; Leonard J. Buckley, et al., "Complex Dielectric Behavior of Polyaniline at Microwave and Millimeter-Wave Frequencies," Synthetic Metals, Vol. 52, 1992, pp. 353–365; P. Hourquebie, et al., "Influence of Structural Parameters of Conducting Polymers on Their Microwave Properties," Synthetic Metals, Vol. 65, 1994, pp. 19–26.

[4] Dwight L. Jaggard and Nader Engheta, "Novel Shielding, Reflection and Scattering Control Using Chiral Materials," U.S. Pat. No. 5,099,242, Mar. 24, 1992.

[5] Robert L. Horst, "Antenna," U.S. Pat. No. 3,331,073, Jul. 11, 1967.

[6] Henning F. Hormuth, "Large Relative Bandwidth Radar," U.S. Pat. No. 4,651,152 Mar. 17, 1987.

Referring to FIG. 2, a side view of the preferred embodiment of the antenna assembly (265) is shown on top of an approaching ship (266). In FIG. 2, an antenna assembly (265) is shown mounted to a mast flange (209c) at a high point of the approaching ship (266). Features of the antenna assembly (265) include an antenna mast (201) and four dipole antenna elements (284), each composed of a pair of dipole verticals (202), attached to a boom (203). At the upper part of the antenna assembly (265) (on top of the antenna mast (201)), there is a lightning rod (211).

Referring to FIG. 3, a perspective view of the antenna assembly (265) alone is shown. FIG. 3 shows a preferred embodiment of the invention, which is a four-element crossed-dipole Adcock antenna assembly (265). The antenna assembly (265) has an antenna mast (201) which has four dipole antenna elements (284) attached to it. An electric dipole antenna element (284) is, roughly, a pair of collinear dipole verticals (202), which are collinear electrically conductive elements, with a short gap (not shown) between them attached to the antenna mast (201) by way of booms (203). An output voltage is developed across the gap. Structural elements are used typically to position and orient the pair of collinear dipole verticals (202).

The antenna assembly (265) includes a top plate (210) fastened with bolts (223) to the top (232) of the top mast flange (209a). The top plate (210) has two eyebolts (221) and a lightning rod (211) attached to it. The eyebolts (221) are to aid lifting of the antenna assembly (265) during its installation. The lightning rod (211) helps to provide protection to the antenna assembly (265) from lightning. A bottom bulkhead (212) is bolted on its top side (230) to the bottomside (233b) of the bottom mast flange (209b) of the antenna mast (201). The bottom bulkhead (212) has electrical connectors so the antenna assembly (265) can be connected to electrical cables (not shown). The bottomside (231) of the bulkhead (212) can then be attached to a mast of a ship (266) (see FIG. 2), at a high point of the ship, or any other platform, building, etc. where direction-finding capabilities with reduced radar reflectivity is desired. A number of bolts, screws, to and gaskets (not shown) are utilized to attach the parts together and at mechanical interfaces.

Referring to FIG. 4, a perspective view of the preferred embodiment of the dipole verticals (202) for the dipole antenna elements (284) (see FIG. 3) is shown. FIG. 4 shows two of the dipole verticals (202). The dipole verticals (202) are made from composite round rods (264) and metal tips (207). The composite round rods (264) are fabricated from electrically-conductive fabric and epoxy. The fabric was woven from filaments of S2 fiberglass coated with anthriquinone-2-sulfonic acid doped polypyrrole. The composite round rods (264) were bonded at one end to the dipole tips (207), which were made from an aluminum alloy, with electrically-conductive (silver-filled) epoxy. The dipole tips (207) primarily serve to improve the ability to solder or weld electrical wires to the dipole verticals (202). The dipole tips (207) have a boss (235) on each side of a flat plate portion (236). The composite round rods (264) have a recessed hole in one end to accept one boss (235), which serves as a self-aligning method when the dipole tips (207) are bonded to the composite round rods (264).

Referring to FIG. 5, the perspective views of the preferred embodiment of the booms (203) for the dipole antenna elements (284) (see FIG. 3) are shown. FIG. 5 shows two assembled booms (203) The antenna element booms (203) are the horizontal portions of the dipole antenna elements (284) (see FIGS. 3 and 7) and are the intermediate parts between the dipole verticals (202) (see FIG. 3) and the center structure or antenna mast (201) (see FIG. 3). One end of the boom (203) has a flange (204) for attachment of the dipole antenna element (284) (see FIG. 7) to the antenna mast (201) (see FIG. 3). In this case, a thin aluminum alloy plate (261) provides an interface for the electrical connector (216) (see FIG. 6 and 7) for a coaxial cable (215) (see FIG. 6 and 7) inside the central opening (263) in the boom (203) and has holes (260a) for screws into the flange (204) and the boom tube (203a) so these parts are self-aligning during their assembly. In addition, the flange (204) has holes (260) for screws (262) (see FIG. 3) to threadably connect through the flange (204) into the antenna mast (201) (see FIG. 3). The end of the boom (203) opposite from the flange (204) has a non-conductive composite round rod (240), with a small cylindrical opening (239) through its length, attached to the boom (203) Note that parts made from materials that are not electrically conductive are also required for the antenna assembly (265) (see FIG. 3). The purpose of the small cylindrical opening (239) is to accept the boss (235) (see FIG. 4) of the dipole verticals (202) (see FIG. 4) and to provide access for the wires (not shown) which attach them to a balun (214) (see FIG. 6) located inside the boom (203) The flange (204) and boom tube (203a) were composites constructed of electrically-conductive fabric and epoxy.

FIG. 6 shows an electrical schematic of a dipole antenna element (284) (see FIG. 3). The balun (214) converts a balanced transmission line (213) [the two dipole verticals (202) (see FIG. 3)] to an unbalanced transmission line. The balun (214) is connected to a coaxial cable (215) with an electrical coaxial connector (not shown) at the flange (204) (see FIG. 3 and 7) of the boom (203) (see FIG. 3) terminating in an electrical connector (216).

FIG. 7 is an exploded view of many of the individual parts of the dipole antenna element (284) of the antenna assembly (265) (see FIG. 3). The boom flange (204) has a o thin aluminum alloy plate (261) attached to it with screw holes (260) therethrough. The thin aluminum alloy plate (261) is an interface surface at one end of the boom (203) At the other end of the boom (203), the nonconductive composite round rod (240) is shown attached in the boom (203) The nonconductive composite round rod (240) has a small cylindrical opening (239) (see FIG. 5) which accepts the boss (235) of the dipole vertical tip (207). The boss (235) and flat plate portion (236) of the dipole vertical tip (207) mate to the flat ends of the nonconductive composite round rod (240). A dipole coupling (206) is shown on the outside end (227) of each dipole vertical (202). The dipole couplings (206) were manufactured from non-conductive composite round tubes. Through the cylindrical openings (241) in their centers, the dipole couplings (206) slide over the dipole verticals (202) to hold them to the booms (203) The external configuration of these dipole couplings (206) is a cylindrical portion (228) next to the boom (203) and a tapered portion (229) where the dipole verticals (202) extend through them. A portion of the transmission means fits inside a cylindrical opening (263) in the boom (203) This transmission means has a balun (214), a coaxial cable (215), and an electrical connector (216). A cover (208) manufactured from electrically conductive material encloses and attaches to the outer end of the boom (203) with four fasteners (222) which fit into corresponding fastener holes (281) in the boom (203).

Referring to FIG. 8, two assembled dipole antenna elements (284) of the antenna assembly (265) (see FIG. 3) are shown. Two dipole verticals (202) are shown attached on opposite sides of one end of a boom (203) These dipole verticals (202) have outside ends (227) at one end and are held in place at the other end with corresponding dipole couplings (206). These dipole couplings (206) help to retain the dipole verticals (202) to the boom (203) At this end of the boom (203) is a cover (208) held in place with four fasteners (222). At the opposite end of the boom (203) is a boom flange (204) and an aluminum alloy plate (261) with screw holes (260), holes (260a) and a connector (216). Within the boom (203) has been inserted the transmission means with a balun (214) (see FIG. 7), a coaxial cable (215) (see FIG. 7), and an electrical connector (216).

FIG. 9 shows the assembled antenna mast (201) composed of an aluminum alloy block (224) between two sections of electrically conductive composite tube sections (225) of woven fabric and epoxy, attached together. The aluminum alloy block (224) of the antenna mast (201) contains tapped holes (282) for attachment of the dipole antenna elements (284) (see FIG. 8). There are four central cylindrical openings (283) in the aluminum alloy block (224) which accept the ends of the electrical connectors (216) (see FIG. 8) from the booms (203) (see FIG. 8) of the four dipole antenna elements (284) (see FIG. 8) for connection with cables (not shown) in the central opening (255) through the antenna mast (201). In addition, mast flanges (209a and 209b), of aluminum alloy and of sufficient thickness, are attached to the composite tube sections (225) at each end of the antenna mast (201). There are advantages to using aluminum alloy parts, but they can be composite materials with embedded threaded inserts, smaller pieces of metal, or similar structures.

Figure 10:
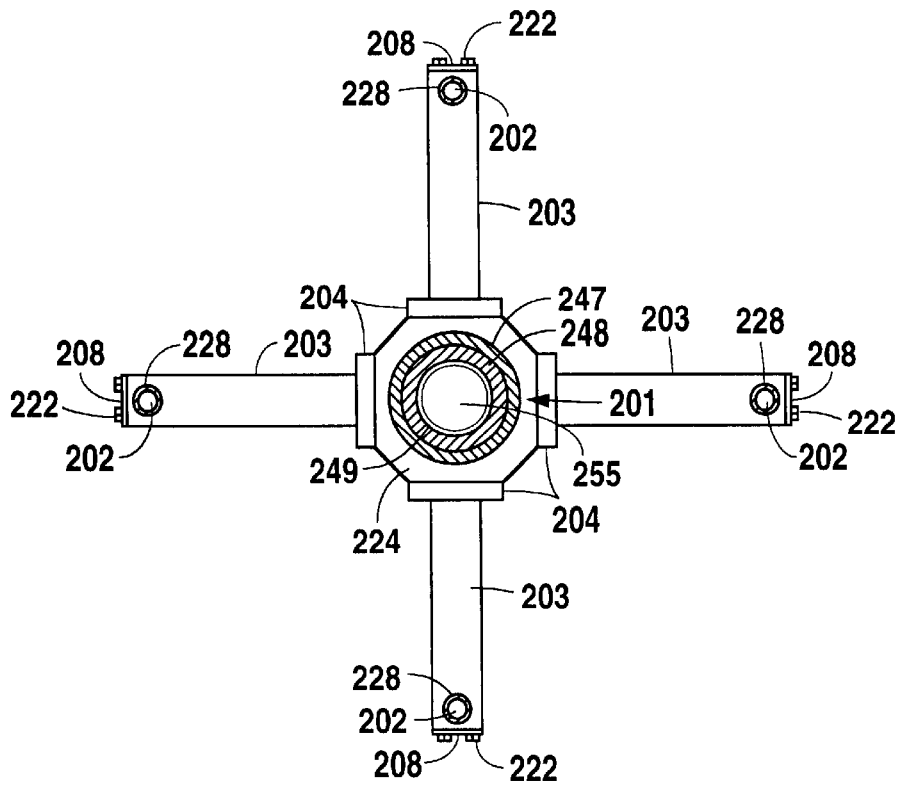
FIG. 10 is a cross section view of FIG. 3 for cutting plane 10—10.

The cross sectional view for cutting plane 10—10 in FIG. 3 is shown in FIG. 10. FIG. 10 provides a different perspective of the relationship of the different parts and assemblies. In particular, the attachment of the booms (203) of the dipole antenna elements (284) to the antenna mast (201) is shown.

Figure 11:
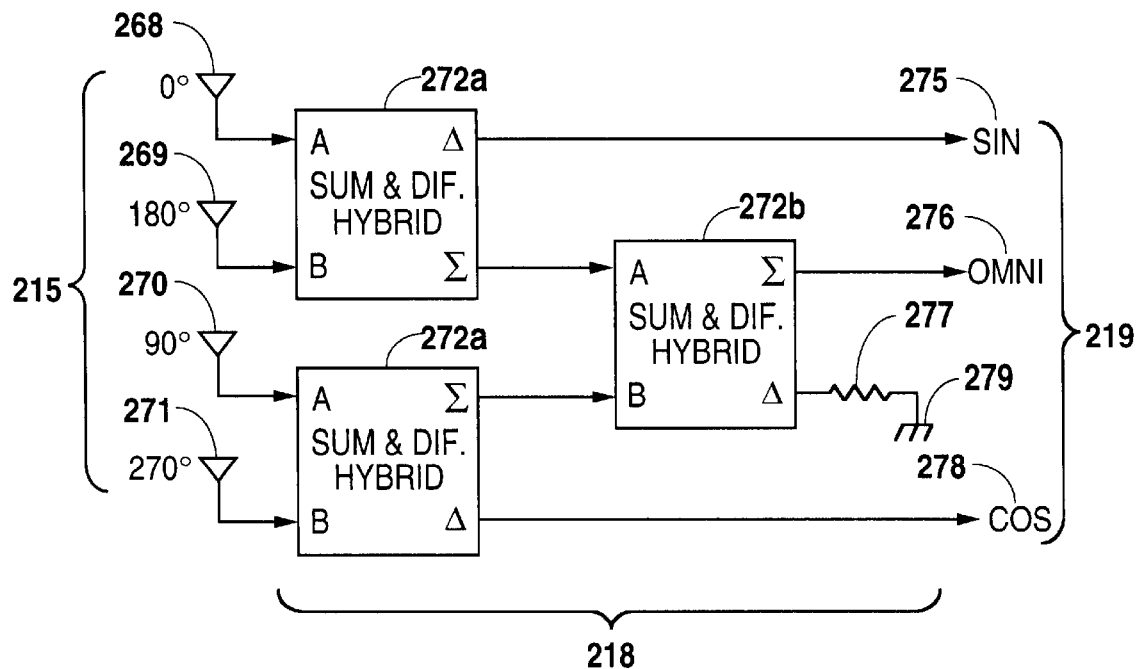
FIG. 11 is an electrical schematic of a crossed-dipole Adcock antenna assembly.

Referring to FIG. 11, the electrical schematic of a crossed-dipole Adcock antenna assembly (265) (see FIG. 3) is shown. FIG. 11 shows the coaxial cables (215) from the four dipole antenna elements (284) (see FIG. 3) connected to a beamformer electrical circuit (218). The outputs of the beamformer electrical circuit (218) are connected to the electrical connectors (219) in the bottom bulkhead (212) (see FIG. 3), which is attached to the bottom of the antenna mast (201) (see FIG. 3). The coaxial cables (215) from the dipole antenna elements (284) (see FIG. 3) are identified according to their respective location on the antenna mast (201) (see FIG. 3). The coaxial cables (215) located at 0° (268) and 180° (269) connect to a first primary sum and difference hybrid component (272a). The difference (Δ) output provides a sine (SIN) (275) function at the bulkhead (212) (see FIG. 3). The sum (Σ) output from the first primary sum and difference hybrid component (272a) connects to a secondary sum and difference hybrid component (272b).

The coaxial cable from the dipole antenna elements (284) (see FIG. 7) located at 90° (270) and 270° (271) connect to a second primary sum and difference hybrid component (272a). The sum (Σ) output from the second primary sum and difference hybrid component (272a) connects to a secondary sum and difference hybrid component (272b). The sum (Σ) output from the secondary sum and difference hybrid component (272b) provides an omnidirectional (OMNI) (276) function at the bulkhead (212) (see FIG. 3). The difference (Δ) output from the secondary sum and difference hybrid component (272b) terminates through a fixed resistor (277) to ground (279). The difference (Δ) output from the second primary sum and difference hybrid component (272a) provides a cosine (COS) (278) function at the bulkhead (212) (see FIG. 3).

Figure 12:
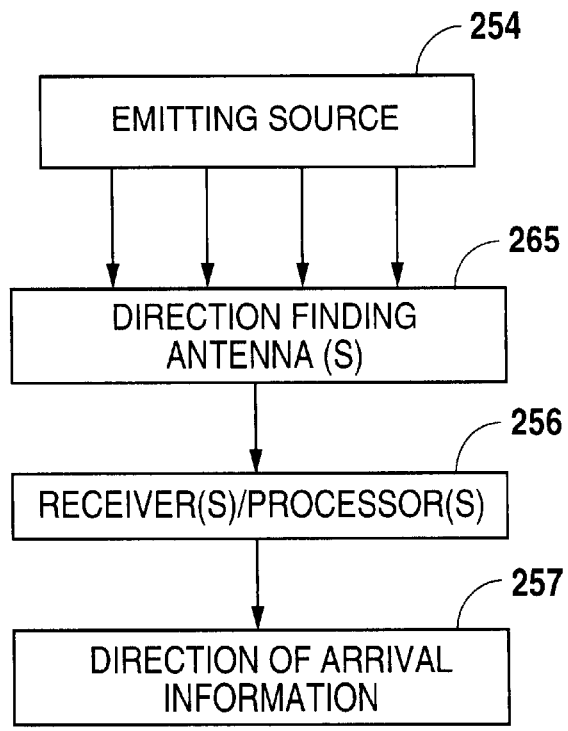
FIG. 12 is a block diagram for a direction-finding system.

FIG. 12 shows a block diagram for a typical direction-finding system. More than one direction-finding antenna can be used to provide the source location and to improve the range and accuracy. An emitting source (254), such as from a hostile ship (267) (see FIG. 1), is detected by the direction-finding antenna assembly (265). Receiver(s) and/or processor(s) (256) use the outputs from the DF antenna(s) to determine the direction of the arrival information (257).

FIGS. 13 through 16 graphically illustrate material characteristics that are important for polymer, composite, direction-finding antennas. Because receiving antennas function by generating voltages as a result of induced currents caused by passing electromagnetic energy, major portions of the antennas must be fabricated from materials which are electrically conductive, volumetrically and at the interface surfaces. This material characteristic is called electrical conductivity. It is denoted by the symbol σ and has the units of Siemens per meter (S/m).

The dielectric characteristic is another important electrical property of the materials because this affects the radar reflectivity of the item. The dielectric properties of materials are customarily given in terms of the permittivity of the material relative to free space. The permittivity can be complex, with the real part often called the dielectric constant and the imaginary component labeled the loss factor or loss index. In equation form, the relative permittivity is given as $$\epsilon_r = \epsilon_r' - j\epsilon_r''.$$

The dielectric constant is the ratio of the electric field storage capacity in a material to that of free space. The loss factor is related to conductivity, as indicated by $$\epsilon_r'' = \sigma/2\pi f \epsilon_0,$$

where f is the frequency and $\epsilon_0$ is the permittivity of free space. The permittivity of free space is $8.846 \times 10^{-12}$ Farads per meter. For an insulator type of material, the permittivity is real, while highly conductive materials have a permittivity that is imaginary with the real component being negligible.

Radar reflectivity (226) (see FIG. 1) or radar cross section is determined from the amount of scattering of incident electromagnetic energy from an object to a radar receiver. This scattering phenomenon can be the result of direct reflection and/or re-radiation from the object. The reflection of electromagnetic waves at an air-dielectric interface is dependent upon the impedance mismatch, determined from the relative permittivity values of the materials to that of free space (air). The reflectivity at an air-dielectric plane interface is given by $$R = \left| \frac{1 - \sqrt{\varepsilon_r}}{1 + \sqrt{\varepsilon_r}} \right|^2.$$

Since $\epsilon_r''$ is a function of frequency, the reflectivity is a function of frequency. Reflectivity has values between 0 and 1, where 0 represents no reflection and 1 represents total reflection of the incident energy.

Figure 13:
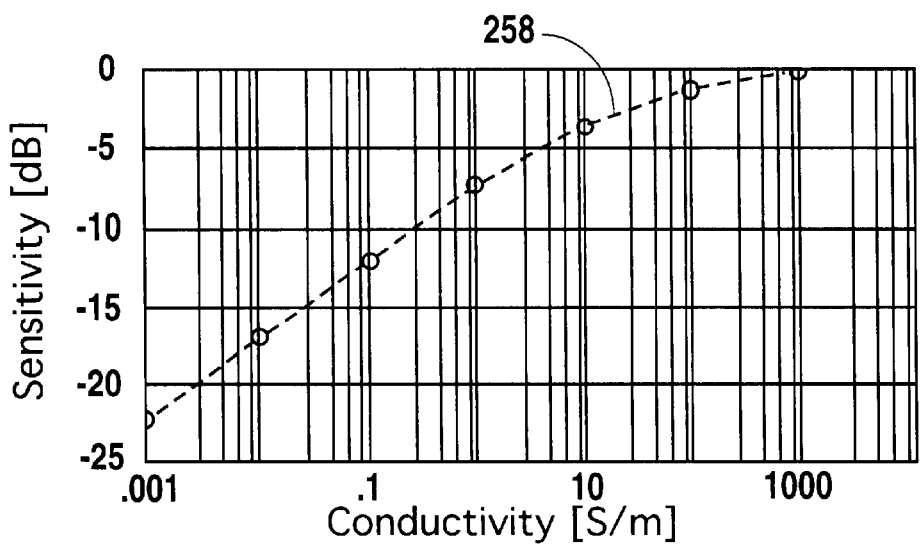
FIG. 13 is a graph of sensitivity roll-off as a function of conductivity for a half-wavelength dipole antenna.

FIG. 13 shows the reduction in sensitivity relative to a perfectly conducting antenna, i.e. metal antenna, as the conductivity is lowered (for the polymer, composite antenna) at their half-wavelength frequency. For conductivities greater than 1,000 S/m, there is no significant loss in sensitivity, but the sensitivity is reduced greatly below 10 S/m (as shown by graph 258).

Figure 14:
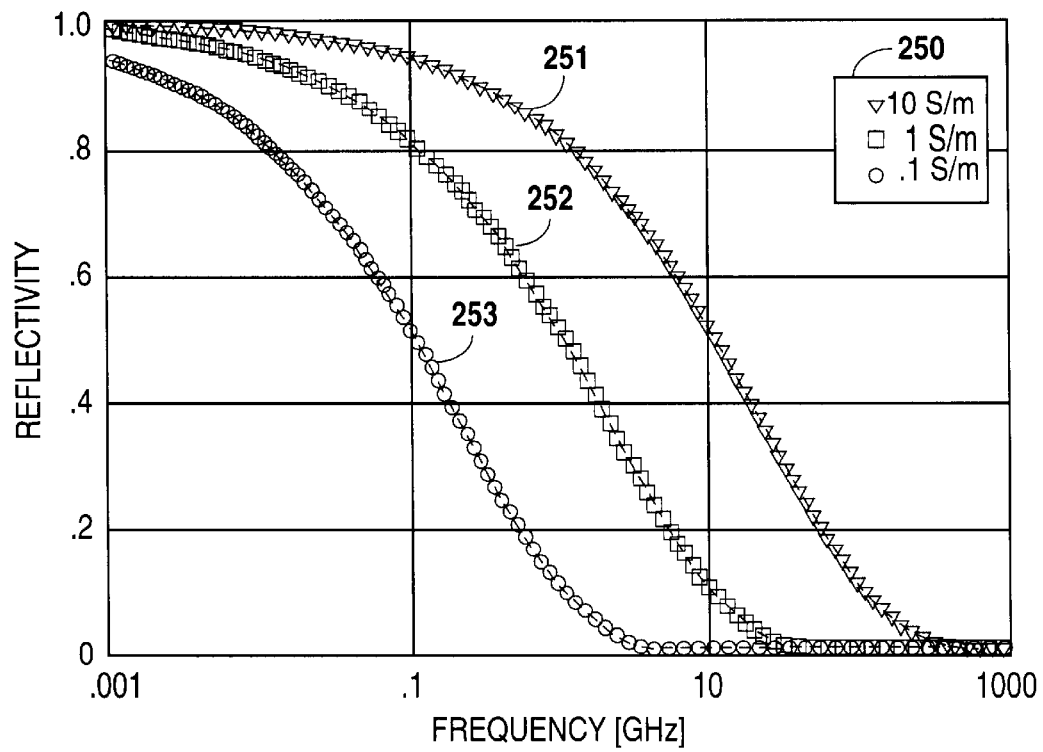
FIG. 14 is a graph of reflectivity versus frequency for various conductivities.

Referring to FIG. 14, graphs of radar reflectivity versus frequency for various material conductivities are shown. More specifically, FIG. 14 shows reflectivity (R) for a frequency range of 0.001 to 1,000 GHz for conductivity values of 0. 1, 1, and 10 S/m (250). A value of 1 was used for $\epsilon_r'$, which is equal to that of air. From FIG. 14 it can be seen that at lower frequencies, $\epsilon_r''$ dominates and most of the energy will be reflected. At higher frequencies, $\epsilon_r''$ is negligible and the reflectivity falls to a level determined by $\epsilon_r'$. Also, lower values of conductivity shift the central curve (252) to the left (253) while higher values of conductivity shift the central curve (252) to the right (251). For low radar reflectivity, a low value of $\epsilon_r$ and, thus, a low value of conductivity is desired.

Thus, a conductivity range of about 10 to 100 S/m was selected so that sensitivity was not sacrificed significantly and yet the radar cross section was reduced. If the electrical conductivity is not sufficiently high, then antennas made from the material will not intercept and conduct enough energy to be of practical use. Aluminum alloys, typically used to fabricate antennas, have a conductivity of approximately $3.8 \times 10^7$ S/m. Conversely, polyethylene, a good insulator, has a conductivity of about $10^{-15}$ S/m. A unique property of some conductive polymer and composite materials is that their conductivities can be varied during the fabrication stage to lie between that of metals and insulators by changing the doping levels of the polymer material that coats the basic material.

Since the composite materials for the antenna mast (201) (see FIG. 3) and the booms (203) (see FIG. 3) do not have to function like the dipole verticals (202) (see FIG. 3), their conductivities can be lower, giving a lower radar reflectivity. However, in addition to supporting the dipole verticals (202) (see FIG. 3), the booms (203) (see FIG. 3) and antenna mast (201) (see FIG. 3) serve the important function of shielding the radio frequency (RF) cables and electronics housed inside, especially at in-band frequencies. Thus, for good shielding characteristics, the transmitted radar energy that is not reflected must be absorbed. The absorptive quality is a function of the penetration depth, which is defined as the depth into the material for which the incident energy has decayed to 37 percent of its initial value.

Figure 15:
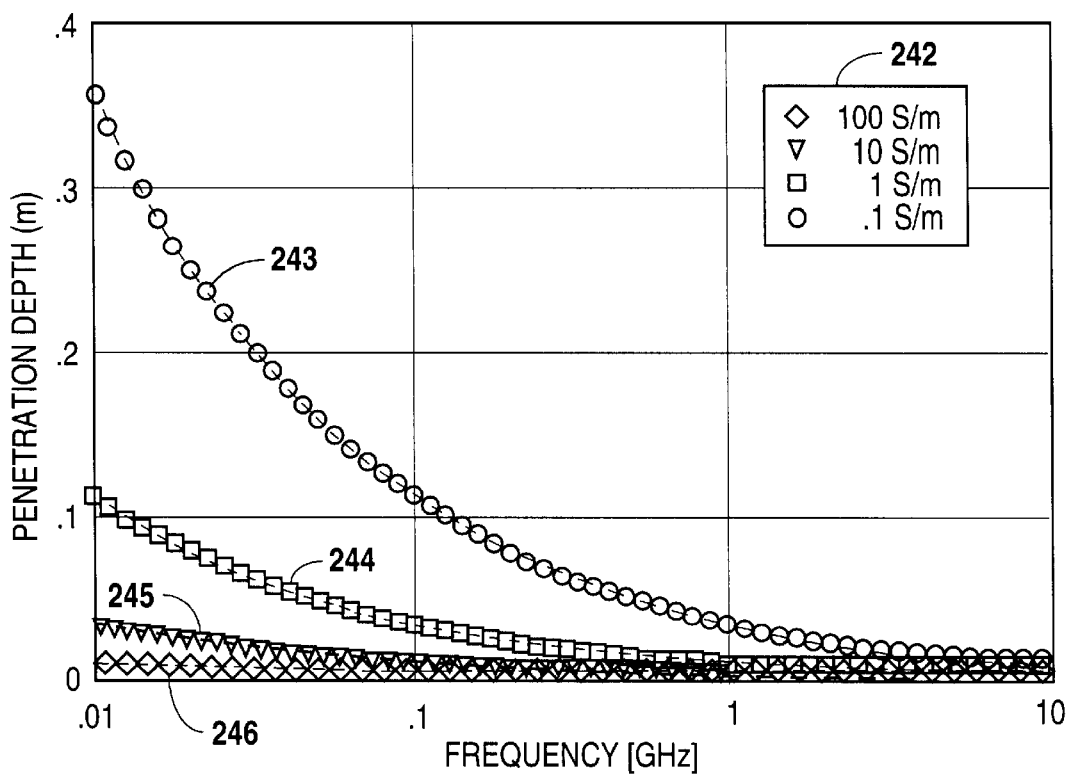
FIG. 15 is a graph of penetration depth versus frequency for various conductivities.

Referring to FIG. 15, a graph of penetration depth versus frequency for various conductivities is shown. FIG. 15 shows penetration depths in meters as a function of frequency for conductivity levels of 0.1, 1, 10, and 100 S/m (242). The graphs show that as the conductivity increases, the penetration depth decreases; and as the frequency increases, the penetration depth decreases. For example, for a conductivity of 0.1 S/m, the penetration depth is the greatest at low frequencies; however, as the frequency increases, penetration depth decreases (as shown by graph 243). When the conductivity is increased to 10 S/m, the penetration depth is again greater at low frequencies (as shown by graph 245). At a frequency of 1 GHz, the penetration depth for a conductivity of 1.0 S/m is about one centimeter (0.4 inch) (as shown by graph 244). In order for the materials to function as an effective radar absorber, the material needs to be at least several penetration depths thick at the lowest radar frequency of interest. The antenna mast (201) (see FIG. 3) was fabricated with two layers of composite with different characteristics to further reduce its radar reflectivity (226) (see FIG. 1). The outer layer (247) (see FIG. 10) had a conductivity of 0.1 S/m and the inner layer (248) (see FIG. 10) had a conductivity of 1.0 S/m.

Figure 16:
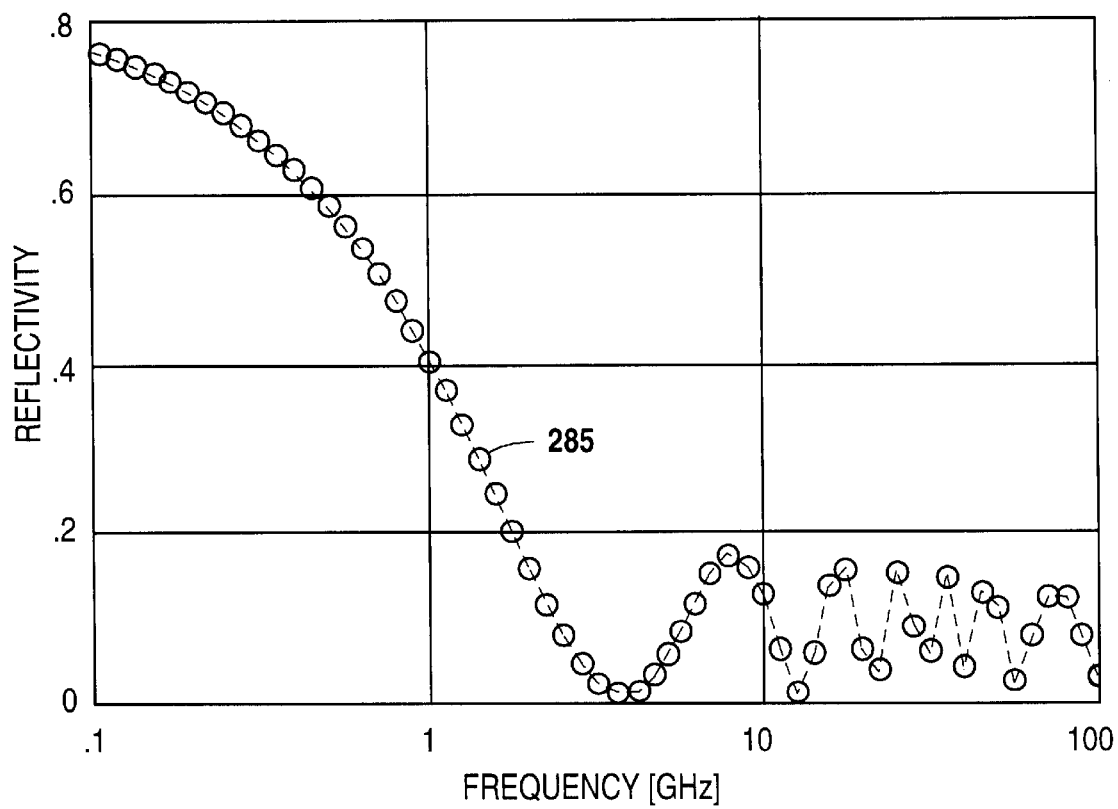
FIG. 16 is a graph of reflectivity from a two-layered mast versus frequency.

Referring to FIG. 16, a theoretical plot (285) of the reflectivity of a two-layer antenna mast (201) (see FIG. 3) as a function of frequency is shown. The wall thickness of the outer composite layer (247) (see FIG. 10) of the antenna mast (201) (see FIG. 3) was about one centimeter (0.4 inch). The wall thicknesses of the booms (203) (see FIG. 3) and the inner layer (248) (see FIG. 10) of the antenna mast (201) (see FIG. 3) were chosen to be approximately one centimeter also. This gives an electrical thickness of at least several penetration depths at the lowest radar frequency of interest. To ensure adequate isolation at in-band frequencies of the beamformer electrical circuit (218) (see FIG. 11), which was located inside the antenna mast (201) (see FIG. 3), the inside of the antenna mast (201) (see FIG. 3) was an aluminum alloy tube (249) (see FIG. 10) that was 0.125 centimeter (0.049 inch) thick. The aluminum alloy tube (249) (see FIG. 10) effectively doubled the thickness of the inner layer (248) (see FIG. 10) of the antenna mast (201) (see FIG. 3), thereby giving twice as much electrical isolation. Additional isolation is not needed for the booms (203) (see FIG. 3) because the baluns (214) (see FIG. 7) and coaxial cables (215) (see FIG. 7) inside the booms (203) (see FIG. 3) had inherent adequate protection.

Measurements and tests have shown that the polymer, composite, direction-finding antenna assembly (265) (see FIG. 3) has roughly equivalent direction-finding characteristics as a standard aluminum alloy version. Its environmental resistance characteristics should also be comparable. In addition, it has the advantage of a reduced radar cross section of up to about 10 dB. The reduced radar cross section, without sacrificing other DF antenna qualities, is the primary new, useful, unique benefit when compared with the known prior art. Also, significant reductions of the amount of metal in the antenna assembly (265) (see FIG. 3) may be important for certain applications. The composites used in the antenna assembly (265) (see FIG. 3) can be tailored to have certain values to obtain good direction-finding capabilities coupled with low radar reflectivity.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. A direction-finding antenna with electronics for receiving radio signals in a frequency range of about 30 megaHertz to about 1 gigahertz, said direction-finding antenna comprising:

at least two collinear dipole verticals, said dipole verticals being constructive at least in part from electrically-conductive polymer composite, said polymer composite having low reflectivity to radar frequency signals, but high conductivity to said frequency range of said radio signals and wherein said dipole verticals are designed for determining the angle of incidence of the propagation direction of a plane electromagnetic wave of said radio signal relative to a reference direction, and connectors and cables for connecting said collinear dipole verticals to said electronics to receive said radio signals for delivery to a processor to process said radio signals to determine the propagation direction of said radio signal for locating the source of said radio signal.

2. The direction-finding antenna of claim 1, further comprising at least one boom being constructed at least in part from said polymer composite, said boom having a first end and a second end, said first end of said boom connected to at least one pair of said collinear dipole verticals.

3. The direction-finding antenna of claim 2, further comprising a mast constructed at least in part from said polymer composite, said mast being connected to said second end of said boom.

4. The direction-finding antenna of claim 2, wherein said mast is connected to said second end of at least one pair of said booms; said mast, boom, and collinear dipole verticals being constructed at least in part from said polymer composite.

5. The direction-finding antenna of claim 1, wherein said polymer composite comprises a composite material with an electrical conductivity between $1 \times 10^{-15}$ Siemens per meter and $3.8 \times 10^7$ Siemens per meter.

6. The direction-finding antenna of claim 5, wherein said polymer composite is selected from materials that have good antenna function characteristics coupled with low radar reflectivity.

7. The direction-finding antenna of claim 6, wherein said polymer composite comprises a reinforcement constituent selected from a first group consisting of polymers, ceramics, glasses, and cements embedded in a matrix constituent selected from a second group consisting of plastic, metal, ceramic, and glass.

8. The direction-finding antenna of claim 7, wherein said polymer composite consists essentially of an electrically-conductive fabric and epoxy.

9. A method of operating a direction-finding antenna in a location where it may receive incident electromagnetic energy from radios and radars, said method of operation consisting of the following steps:

receiving a radio signal through said direction-finding antenna; and simultaneously, providing a low level radar echo due to said direction-finding antenna being constructed from a polymer composite having low conductivity at the frequencies of radar operation.

10. The method of operating a direction-finding antenna of claim 9, wherein said polymer composite is constructed from a composite material with an electrical conductivity between $1 \times 10^{-15}$ Siemens per meter and $3.8 \times 10^7$ Siemens per meter.

11. The method of operating a direction-finding antenna of claim 10, wherein said polymer composite is selected from materials that have good antenna function characteristics coupled with low radar reflectivity.

12. The method of operating a direction-finding antenna of claim 11, wherein said polymer composite is constructed from a reinforcement constituent selected from a group consisting of polymers, ceramics, glasses, and cements, which is embedded in a matrix constituent selected from a group consisting of plastic, metal, ceramic and glass.

13. The method of operating a direction-finding antenna of claim 12, wherein said polymer composite consists essentially of electrically-conductive fabric and epoxy.

* * * * *